(12) United States Patent
Nakata et al.

(10) Patent No.: US 6,297,305 B1
(45) Date of Patent: Oct. 2, 2001

(54) CURABLE SILICONE COMPOSITION

(75) Inventors: Toshiki Nakata; Masayuki Onishi, both of Chiba Prefecture (JP)

(73) Assignee: Dow Corning Toray Silicone Company, Ltd., Tokyo (JP)

( * ) Notice: Subject to any disclaimer, the term of this patent is extended or adjusted under 35 U.S.C. 154(b) by 0 days.

(21) Appl. No.: 09/384,354

(22) Filed: Aug. 27, 1999

(30) Foreign Application Priority Data

Sep. 2, 1998 (JP) .................................................. 10-248369
Sep. 10, 1998 (JP) .................................................. 10-256261

(51) Int. Cl.$^7$ ....................................................... C08J 5/10
(52) U.S. Cl. .......................... 524/313; 524/588; 524/862; 524/773; 528/15; 528/31
(58) Field of Search ........................ 528/15, 31; 524/773, 524/862, 313, 588

(56) References Cited

FOREIGN PATENT DOCUMENTS

| 618 257 | * | 10/1994 | (EP) . | |
|---|---|---|---|---|
| 0 618 257 A1 | | 10/1994 | (EP) | ................................. C08K/5/10 |
| 664 322 | * | 7/1995 | (EP) . | |
| 0 664 322 A1 | | 7/1995 | (EP) | ................................. C08L/83/07 |
| 0 799 859 A2 | | 10/1997 | (EP) | ................................. C08L/83/04 |
| 62-1750 | | 1/1987 | (JP) . | |
| 62-7763 | | 1/1987 | (JP) . | |

* cited by examiner

*Primary Examiner*—Margaret G. Moore
(74) *Attorney, Agent, or Firm*—Larry A. Milco

(57) ABSTRACT

The present invention relates to a curable silicone composition which contains an air-oxidation-curable unsaturated compound, and which is cured by means of a hydrosilylation reaction and a condensation reaction. An example of such a curable silicone composition is a curable silicone composition which includes (A) a mixture of (a) an organopolysiloxane which contains at least two alkoxy groups bonded to silicon atoms in each molecule, and which does not contain any alkenyl groups bonded to silicon atoms, and an organopolysiloxane which contains at least two alkenyl groups bonded to silicon atoms in each molecule, and which does not contain any alkoxy groups bonded to silicon atoms, or (b) an organopolysiloxane which respectively contains at least two alkoxy groups bonded to silicon atoms and two alkenyl groups bonded to silicon atoms in each molecule, (B) an organopolysiloxane which contains at least two hydrogen atoms bonded to silicon atoms in each molecule, (C) a condensation reaction catalyst, (D) a platinum type catalyst, and (E) an air-oxidation-curable unsaturated compound.

10 Claims, No Drawings

CURABLE SILICONE COMPOSITION

FIELD OF THE INVENTION

The present invention relates to a curable silicone composition, and more specifically a curable silicone composition which can form a cured product with superior matte properties as a result of being cured by a hydrosilylation reaction and a condensation reaction.

BACKGROUND OF THE INVENTION

Curable silicone compositions which are cured by a hydrosilylation reaction and a condensation reaction can be cured by heating or by means of moisture in the air. Accordingly, such compositions are suitable for use as fillers or adhesive agents such as sealing agents, etc., used in electrical and electronic devices, etc.

However, in the case of such curable silicone compositions, the cured product obtained by curing has surface luster; as a result, in cases where this cured product is used as a filler or adhesive agent for the waterproofing of an LED (light-emitting diode) display device, etc., the cured product reflects light from the LEDs and light from the outside, so that the visual recognition characteristics are poor.

Accordingly, attempts have been made to deluster the cured product obtained in such cases by mixing an inorganic filler with the curable silicone composition; however, it has not been possible to endow such compositions with sufficient matte properties. Furthermore, large quantities of filler must be used in order to endow such compositions with matte properties; however, if such large quantities of filler are used, the fluidity of the curable silicone composition that is obtained drops, so that the handling and working characteristics of the composition deteriorate.

The object of the present invention is to provide a curable silicone composition which can form a cured product with superior matte properties as a result of being cured by a hydrosilylation reaction and a condensation reaction.

DETAILED DESCRIPTION OF THE INVENTION

The present invention relates to a curable silicone composition which is cured by a hydrosilylation reaction and a condensation reaction, and which is characterized by the fact that the composition contains an air-oxidation-curable unsaturated compound.

This unsaturated compound is a component which is used to endow the cured product obtained by curing the present composition with sufficient matte properties. Such unsaturated compounds are cured by the oxidation of the unsaturated bonds in the molecule by oxygen contained in the air; typical examples of such unsaturated compounds are aliphatic compounds which have at least two unsaturated bonds per molecule. Examples of such compounds include unsaturated higher fatty acids such as linolenic acid and linolic acid, etc.; fats and oils consisting of esters of unsaturated higher fatty acids and glycerol such as tung oil, linseed oil and soybean oil, etc.; esters of unsaturated higher fatty acids and alcohols such as methyl linolenate and methyl linolate, etc.; unsaturated hydrocarbon compounds such as butadiene, pentadiene and hexadiene, etc.; and polymers of such compounds. In particular, linolenic acid, alkyl linolenates, tung oil, linseed oil, 1,3-hexadiene and polybutadienes are especially desirable.

In the present invention, it is desirable that the content of the abovementioned air-oxidation-curable unsaturated compound be in the range of 0.01 to 50 parts by weight per 100 parts by weight of the silicone component in the present composition; a content in the range of 0.1 to 20 parts by weight is even more desirable, and a content in the range of 0.1 to 10 parts by weight is especially desirable. Note that if the content of this unsaturated compound is less than the lower limit of the abovementioned range, there tends to be an insufficient endowment of the resulting cured silicone product with matte properties. On the other hand, if the content exceeds the upper limit of the abovementioned range, the mechanical characteristics of the resulting cured silicone product tend to deteriorate.

It is desirable that such a curable silicone composition which is cured by a hydrosilylation reaction and a condensation reaction be a composition consisting of at least (A) a mixture of (a) an organopolysiloxane which contains at least two alkoxy groups bonded to silicon atoms in each molecule, and which does not contain any alkenyl groups bonded to silicon atoms, and (b) an organopolysiloxane which contains at least two alkenyl groups bonded to silicon atoms in each molecule, and which does not contain any alkoxy groups bonded to silicon atoms, or alternatively to the combination of (a) and (b), (c) an organopolysiloxane which respectively contains at least two alkoxy groups bonded to silicon atoms and two alkenyl groups bonded to silicon atoms in each molecule, (B) an organopolysiloxane which contains at least two hydrogen atoms bonded to silicon atoms in each molecule, (C) a condensation reaction catalyst, (D) a platinum type catalyst, and (E) an air-oxidation-curable unsaturated compound.

Component (A) is a mixture of (a) an organopolysiloxane which contains at least two alkoxy groups bonded to silicon atoms in each molecule, and which does not contain any alkenyl groups bonded to silicon atoms, and (b) an organopolysiloxane which contains at least two alkenyl groups bonded to silicon atoms in each molecule, and which does not contain any alkoxy groups bonded to silicon atoms, or (c) an organopolysiloxane which respectively contains at least two alkoxy groups bonded to silicon atoms and two alkenyl groups bonded to silicon atoms in each molecule. Component (a) should have at least two alkoxy groups bonded to silicon atoms in each molecule; if the number of alkoxy groups bonded to silicon atoms is less than two groups per molecule, it is difficult to achieve sufficient curing of the resulting composition by means of a condensation reaction.

The molecular structure of component (a) may be linear, linear with partial branching, or branched. In particular, a linear structure is especially desirable. Examples of alkoxy groups which may constitute the alkoxy groups bonded to silicon atoms in component (a) include methoxy groups, ethoxy groups, propoxy groups, butoxy groups, methoxymethoxy groups and methoxyethoxy groups. In particular, methoxy groups are especially desirable. The bonding positions of these alkoxy groups may be on the terminals of the molecular chains, or on side chains of the molecular chains; bonding on the terminals of the molecular chains is especially desirable, since the reactivity is good in the case of such bonding positions. These alkoxy groups may be directly bonded to silicon atoms of the principal chains, or may be bonded to silicon atoms which are in turn bonded to silicon atoms of the principal chains via alkylene groups. Furthermore, examples of groups other than alkoxy groups which may be bonded to silicon atoms in component (a) include alkyl groups such as methyl groups, ethyl groups, propyl groups, butyl groups, pentyl groups, hexyl groups, heptyl groups, octyl groups, nonyl groups, decyl groups and octadecyl groups, etc.; cycloalkyl groups such as cyclopentyl groups and cyclohexyl groups, etc.; aryl groups such as phenyl groups, tolyl groups, xylyl groups and naphthyl groups, etc.; aralkyl groups such as benzyl groups, phenethyl groups and phenylpropyl groups, etc.; and halogenated alkyl groups such as 3-chloropropyl groups and 3,3,3-trifluoropropyl groups, etc. In particular, methyl groups and phenyl groups are especially desirable. Furthermore, it is desirable that the viscosity of component (a) be in the range of 20 to 200,000 mPa·s at 25° C., and a viscosity in the range of 100 to 100,000 mPa·s is especially desirable. Note that if the viscosity at 25° C. is less than the lower limit of the above-mentioned range, physical properties of the resulting cured product such as softness and elongation, etc., tend to deteriorate; on the other hand, if the viscosity exceeds the upper limit of the above-mentioned range, the handling and working characteristics of the resulting composition tend to deteriorate.

Examples of organopolysiloxanes which can be used as the organopolysiloxanes of component (a) include dimethylpolysiloxanes in which both ends of the molecular chains are closed by trimethoxysiloxy groups, dimethylsiloxane-methylphenylsiloxane copolymers in which both ends of the molecular chains are closed by trimethoxysiloxy groups, dimethylpolysiloxanes in which both ends of the molecular chains are closed by triethoxysiloxy groups, dimethylpolysiloxanes in which both ends of the molecular chains are closed by tripropoxysiloxy groups, dimethylpolysiloxanes in which both ends of the molecular chains are closed by methyldimethoxysiloxy groups, dimethylpolysiloxanes in which both ends of the molecular chains are closed by methyldiethoxysiloxy groups, dimethylsiloxane-methylphenylsiloxane copolymers in which both ends of the molecular chains are closed by methyldimethoxysiloxy groups, dimethylpolysiloxanes in which both ends of the molecular chains are closed by trimethoxysilylethyldimethylsiloxy groups, dimethylpolysiloxanes in which both ends of the molecular chains are closed by trimethoxysilylethyldimethylsiloxy groups, dimethylpolysiloxanes in which both ends of the molecular chains are closed by trimethoxysilylethyldimethylsiloxy groups, dimethylsiloxane-methylphenylsiloxane copolymers in which both ends of the molecular chains are closed by trimethoxysilylethyldimethylsiloxy groups, dimethylpolysiloxanes in which both ends of the molecular chains are closed by methyldimethoxysilylethyldimethylsiloxy groups, dimethylsiloxane-methylphenylsiloxane copolymers in which both ends of the molecular chains are closed by methyldimethoxysilylethyldimethylsiloxy groups, dimethylsiloxane-methyl (trimethoxysilylethyl)siloxane copolymers in which both ends of the molecular chains are closed by trimethylsiloxy groups, dimethylsiloxanemethyl(trimethoxysilylethyl) siloxane copolymers in which both ends of the molecular chains are closed by trimethylsiloxy groups, dimethylsiloxane-methyl (trimethylsilylethyl)siloxane copolymers in which both ends of the molecular chains are closed by trimethoxysilylethyldimethylsiloxy groups, and mixtures consisting of two or more such organopolysiloxanes.

Furthermore, component (b) should contain at least two alkenyl groups bonded to silicon atoms in each molecule; the reason for this is that if the number of alkenyl groups bonded to silicon atoms is less than two per molecule, it is difficult to achieve sufficient curing of the resulting composition by means of a hydrosilylation reaction. The molecular structure of component (b) may be linear, linear with some branching, branched, cyclic or resin-form. The alkenyl groups bonded to silicon atoms in component (b) may be vinyl groups, allyl groups, butenyl groups, pentenyl groups or hexenyl groups, etc. In particular, vinyl groups are especially desirable. The bonding positions of these alkenyl groups may be on the terminals of the molecular chains, or on side chains of the molecular chains; bonding on the terminals of the molecular chains is especially desirable, since the reactivity is good in the case of such bonding positions. Furthermore, examples of groups other than alkenyl groups which may be bonded to silicon atoms in component (a) include alkyl groups such as methyl groups, ethyl groups, propyl groups, butyl groups, pentyl groups, hexyl groups, heptyl groups, octyl groups, nonyl groups, decyl groups and octadecyl groups, etc.; cycloalkyl groups such as cyclopentyl groups and cyclohexyl groups, etc.; aryl groups such as phenyl groups, tolyl groups, xylyl groups and naphthyl groups, etc.; aralkyl groups such as benzyl groups, phenethyl groups and phenylpropyl groups, etc.; and halogenated alkyl groups such as 3-chloropropyl groups and 3,3,3-trifluoropropyl groups, etc. In particular, methyl groups and phenyl groups are especially desirable. Furthermore, it is desirable that the viscosity of component (b) be in the range of 20 to 200,000 mPa·s at 25° C., and a viscosity in the range of 100 to 100,000 mPa·s is especially desirable. Note that if the viscosity at 25° C. is less than the lower limit of the above-mentioned range, physical properties of the resulting cured product such as softness and elongation, etc., tend to deteriorate; on the other hand, if the viscosity exceeds the upper limit of the above-mentioned range, the handling and working characteristics of the resulting composition tend to deteriorate.

Examples of organopolysiloxanes which can be used as the organopolysiloxane of this component (b) include dimethylsiloxane-methylvinylsiloxane copolymers in which both ends of the molecular chains are closed by trimethylsiloxy groups, methylvinylpolysiloxanes in which both ends of the molecular chains are closed by trimethylsiloxy groups, dimethylsiloxane-methylvinylsiloxane-methylphenylsiloxane copolymers in which both ends of the molecular chains are closed by trimethylsiloxy groups, dimethylpolysiloxanes in which both ends of the molecular chains are closed by dimethylvinylsiloxy groups, dimethylsiloxane-methylvinylsiloxane copolymers in which both ends of the molecular chains are closed by dimethylvinylsiloxy groups, dimethylsiloxane-methylvinylsiloxane-methylphenylsiloxane copolymers in which both ends of the molecular chains are closed by dimethylvinylsiloxy groups, organopolysiloxanes consisting of siloxane units expressed by the formula $(CH_2=CH)(CH_3)_2SiO_{1/2}$ and siloxane units expressed by the formula $SiO_{4/2}$, organopolysiloxanes consisting of siloxane units expressed by the formula $(CH_3)_3SiO_{1/2}$, siloxane units expressed by the formula $(CH_2=CH)(CH_3)_2SiO_{1/2}$ and siloxan expressed by the formula $SiO_{4/2}$, organopolysiloxanes consisting of siloxane units expressed by the formula $(CH_3)_3SiO_{1/2}$, siloxane units expressed by the formula $(CH_2=CH)(CH_3)_2SiO_{1/2}$, siloxane units expressed by the formula $(CH_3)_2SiO_{2/2}$ and siloxane units expressed by the formula $SiO_{4/2}$, and mixtures consisting of two or more of these organopolysiloxanes.

It is desirable that the content of component (a) in component (A) be in the range of 5 to 95 wt %, and that the content of component (b) constitute the remainder of component (A) (in wt %). Note that if the content of component (a) in component (A) is less than the lower limit of the abovementioned range, it tends to be difficult to achieve sufficient curing of the resulting composition by means of a condensation reaction; on the other hand, if this content exceeds the upper limit of the abovementioned range, it tends to be difficult to achieve sufficient curing of the resulting composition by means of a hydrosilylation reaction.

Furthermore, component (c) is an organopolysiloxane which respectively contains at least two alkoxy groups bonded to silicon atoms and two alkenyl groups bonded to silicon atoms in each molecule. Component (c) contains at least two alkoxy groups bonded to silicon atoms in each molecule; if the number of alkoxy groups bonded to silicon atoms is less than two per molecule, it becomes difficult to achieve sufficient curing of the resulting composition by means of a condensation reaction. Furthermore, component (c) contains at least two alkenyl groups bonded to silicon atoms in each molecule; if the number of alkenyl groups bonded to silicon atoms is less than two per molecule, it becomes difficult to achieve sufficient curing of the resulting composition by means of a hydrosilylation reaction. The molecular structure of component (c) may be linear, linear with some branching, or branched. In particular, a linear structure is especially desirable. Examples of alkoxy groups which may be bonded to silicon atoms in component (c) include methoxy groups, ethoxy groups, propoxy groups and butoxy groups, etc. In particular, methoxy and ethoxy groups are especially desirable. Furthermore, examples of alkenyl groups which may be bonded to silicon atoms in component (c) include vinyl groups, allyl groups, butenyl groups, pentenyl groups, hexenyl groups and heptenyl groups. In particular, vinyl groups are especially desirable. The bonding positions of these alkenyl groups may be on the terminals of the molecular chains, or on molecular side chains. Furthermore, examples of groups other than alkoxy groups and alkenyl groups which may be bonded to silicon atoms in component (c) include alkyl groups such as methyl groups, ethyl groups, propyl groups, butyl groups, pentyl groups, hexyl groups, heptyl groups, octyl groups, nonyl groups, decyl groups and octadecyl groups, etc.; cycloalkyl groups such as cyclopentyl groups and cyclohexyl groups, etc.; aryl groups such as phenyl groups, tolyl groups, xylyl groups and naphthyl groups, etc.; aralkyl groups such as benzyl groups, phenethyl groups and phenylpropyl groups, etc.; and halogenated alkyl groups such as 3-chloropropyl groups and 3,3,3-trifluoropropyl groups, etc. Furthermore, it is desirable that the viscosity of component (b) be in the range of 20 to 200,000 mPa·s at 25° C., and a viscosity in the range of 100 to 100,000 mPa·s is especially desirable. The reasons for this are as follows: specifically, if the viscosity at 25° C. is less than the lower limit of the above-mentioned range, physical properties of the resulting cured product tend to deteriorate; on the other hand, if the viscosity exceeds the upper limit of the above-mentioned range, the handling and working characteristics of the resulting composition tend to deteriorate.

Examples of organopolysiloxanes which can be used as the organopolysiloxane of this component (c) include dimethylsiloxane-methylvinylsiloxane copolymers in which both ends of the molecular chains are closed by trimethoxysiloxy groups, dimethylsiloxane-methylvinylsiloxane-methylphenylsiloxane copolymers in which both ends of the molecular chains are closed by trimethoxysiloxy groups, dimethylsiloxane-methylvinylsiloxane copolymers in which both ends of the molecular chains are closed by triethoxysiloxy groups, dimethylsiloxane-methylvinylsiloxane copolymers in which both ends of the molecular chains are closed by tripropoxysiloxy groups, dimethylsiloxane-methylvinylsiloxane copolymers in which both ends of the molecular chains are closed by methyldimethoxysiloxy groups, dimethylsiloxanemethyl vinylsiloxane copolymers in which both ends of the molecular chains are closed by methyldiethoxysiloxy groups, dimethylsiloxane-methylvinylsiloxane methylphenylsiloxane copolymers in which both ends of the molecular chains are closed by methyldimethoxysiloxy groups, dimethylsiloxane-methylvinylsiloxane-methyl (trimethoxysilylethyl) siloxane copolymers in which both ends of the molecular chains are closed by trimethylsiloxy groups, dimethylsiloxane-methylvinylsiloxane-methyl (trimethoxysilylethyl)siloxane copolymers in which both ends of the molecular chains are closed by trimethylsiloxy groups, dimethylsiloxane-methylvinylsiloxane-methyl(trimethylsilylethyl)siloxane copolymers in which both ends of the molecular chains are closed by trimethoxysilylethyldimethylsiloxy groups, and mixtures consisting of two or more of these organopolysiloxanes.

Furthermore, the organopolysiloxane of component (B) is a component which is used to cure the present composition by means of a hydrosilylation reaction between the alkenyl groups bonded to silicon atoms in component (A) and the hydrogen atoms bonded to silicon atoms in the present component. Component (B) contains at least two hydrogen atoms bonded to silicon atoms in each molecule; the reason for this is that if the number of hydrogen atoms bonded to silicon atoms is less than two per molecule, it becomes difficult to achieve sufficient curing of the resulting composition by means of a hydrosilylation reaction; furthermore, curing is conspicuously retarded. The molecular structure of component (B) may be linear, linear with some branching, cyclic or resin-form. The bonding positions of the hydrogen atoms bonded to silicon atoms may be located on the terminals of the molecular chains, or on molecular side chains. Furthermore, examples of groups other than hydrogen atoms which may be bonded to silicon atoms in component (B) include alkyl groups such as methyl groups, ethyl groups, propyl groups, butyl groups, pentyl groups, hexyl groups, heptyl groups, octyl groups, nonyl groups, decyl groups and octadecyl groups, etc.; cycloalkyl groups such as cyclopentyl groups and cyclohexyl groups, etc.; aryl groups such as phenyl groups, tolyl groups, xylyl groups and naphthyl groups, etc.; aralkyl groups such as benzyl groups, phenethyl groups and phenylpropyl groups, etc.; halogenated alkyl groups such as 3-chloropropyl groups and 3,3,3-trifluoropropyl groups, etc.; and alkoxy groups such as methoxy groups and ethoxy groups, etc. In particular, methyl groups and phenyl groups are especially desirable. Furthermore, it is desirable that the viscosity of component (B) be in the range of 2 to 20,000 mPa·s at 25° C. The reasons for this are as follows: specifically, if the viscosity at 25° C. is less than the lower limit of the abovementioned range, the organopolysiloxane tends to volatilize, so that the make-up of the resulting composition is unstable; on the other hand, if the viscosity exceeds the upper limit of this range, the handling and working characteristics of the resulting composition tend to deteriorate.

Examples of organopolysiloxanes which can be used as the organopolysiloxane of this component (B) include methylhydridopolysiloxanes in which both ends of the molecular chains are closed by trimethylsiloxy groups, dimethylsiloxane-methylhydridosiloxane copolymers in which both ends of the molecular chains are closed by trimethylsiloxy groups, dimethyl-polysiloxanes in which both ends of the molecular chains are closed by dimethylhydridosiloxy groups, dimethylsiloxane methylhydridosiloxane copolymers in which both ends of the molecular chains are closed by dimethylhydridosiloxy groups, organopolysiloxanes consisting of siloxane units expressed by the formula $(CH_3)_2HSiO_{1/2}$ and siloxane units expressed by the formula $SiO_{4/2}$, organopolysiloxanes consisting of siloxane units expressed by the formula $(CH_3)_3SiO_{1/2}$, siloxane units expressed by the formula $(CH_3)_2HSiO_{1/2}$ and siloxane units expressed by the formula $SiO_{4/2}$, organopolysiloxanes consisting of siloxane units expressed by the formula $(CH_3)_3SiO_{1/2}$, siloxane units expressed by the formula $(CH_3)_2HSiO_{1/2}$ and siloxane units expressed by the formula $(CH_3)_2SiO_{2/2}$ or siloxane units expressed by the formula $SiO_{4/2}$, and mixtures consisting of two or more of these organopolysiloxanes.

In the abovementioned composition, it is desirable that the content of component (B) be an amount which is such that the molar ratio of hydrogen atoms bonded to silicon atoms in the present component to alkenyl groups bonded to silicon atoms in component (A) is in the range of 0.3 to 20, and a content which is such that this molar ratio is in the range of 0.5 to 50 is especially desirable. Note that if the molar ratio of hydrogen atoms bonded to silicon atoms in the present component to alkenyl groups bonded to silicon atoms in component (A) is less than the lower limit of the abovementioned range, it tends to become difficult to achieve sufficient curing of the resulting composition by means of a hydrosilylation reaction; on the other hand, if this molar ratio exceeds the upper limit of the abovementioned range, the physical characteristics of the resulting cured product tend to deteriorate.

Furthermore, the condensation reaction catalyst of component (C) is a catalyst which is used to accelerate the condensation reaction of the alkoxy groups bonded to silicon atoms in component (A). Catalysts which can be used as this condensation reaction catalyst of component (C) include organic titanium type condensation reaction catalysts, organic zirconium type condensation reaction catalysts and organic aluminum type condensation reaction catalysts. Examples of such organic titanium type condensation reaction catalysts include organic titanic acid esters such as tetrabutyl titanate and tetraisopropyl titanate, etc., and organic titanium chelate compounds such as diisopropoxybis(acetylacetato)titanium and diisopropoxybis(ethylacetoacetato)titanium, etc. Examples of the abovementioned organic zirconium type condensation reaction catalysts include organic zirconium esters such as zirconium tetrapropylate and zirconium tetrabutyrate, etc., and organic zirconium chelate compounds such as zirconium diacetate, zirconium tetra(acetylacetonate), tributoxyzirconium acetylacetonate, dibutoxyzirconium bis(acetylacetonate), tributoxyzirconium acetoacetate and dibutoxyzirconium acetylacetonato(ethylacetoacetate), etc. Furthermore, examples of the abovementioned organic aluminum type condensation reaction catalysts include organic aluminum esters such as aluminum triethylate, aluminum triisopropylate, aluminum tri(sec-butyrate) and mono(sec-butoxy)aluminum diisopropylate, etc., and organic aluminum chelate compounds such as diisopropoxyaluminum (ethylacetoacetate), aluminum tris(ethylacetoacetate), aluminum bis(ethylacetoacetate) monoacetylacetonate and aluminum tris(acetylacetonate), etc. The abovementioned catalysts may be used singly or in mixtures consisting of two or more catalysts as the condensation reaction catalyst of component (C).

The content of component (C) is an amount that is sufficient to cure the abovementioned composition by means of a condensation reaction; generally, it is desirable that this content be in the range of 0.01 to 10 parts by weight per 100 parts by weight of component (A), and a content in the range of 0.1 to 5 parts by weight is especially desirable. If the content of component (C) is less than the lower limit of the abovementioned range, it tends to become difficult to achieve sufficient curing of the resulting composition by means of a condensation reaction; on the other hand, if this content exceeds the upper limit of the above-mentioned range, the storage stability of the resulting composition tends to deteriorate, as do the handling and working characteristics of the composition.

Furthermore, the platinum type catalyst of component (D) is a catalyst that is used to accelerate the hydrosilylation reaction between the alkenyl groups bonded to silicon atoms in component (A) and the hydrogen atoms bonded to silicon atoms in component (B). Examples of catalysts that can be used as the platinum type catalyst of component (D) include platinum black, platinum supported on active carbon, platinum supported on finely powdered silica, chloroplatinic acid, alcohol solutions of chloroplatinic acid, complexes of platinum and olefins, complexes of platinum and vinylsiloxane, and finely powdered catalysts consisting of thermoplastic resins containing these platinum type catalysts. Examples of thermoplastic resins that can be used include silicone resins, polycarbonate resins, acrylic resins, nylon resins and polyester resins. Furthermore, it is desirable that the softening point of such thermoplastic resins be 5 to 200° C., and that the particle size of the resins be 0.01 to 10 μm.

The content of component (D) is an amount that is sufficient to cure the abovementioned composition by means of a hydrosilylation reaction; generally, it is desirable that this content be an amount which is such that the amount of platinum metal in component (D) is in the range of 0.01 to 1000 ppm (in weight units) relative to the silicone component in the abovementioned composition, and an amount such that the amount of platinum metal is in the range of 0.5 to 200 ppm is especially desirable. If the content of component (D) is less than the lower limit of the abovementioned range, it tends to become difficult to achieve sufficient curing of the resulting composition by means of a hydrosilylation reaction; on the other hand, even if this content exceeds the upper limit of the abovementioned range, the curing reaction of the resulting composition is not conspicuously accelerated, and there is a danger that problems of coloring, etc., will arise in the resulting composition.

Furthermore, the air-oxidation-curable unsaturated compound of component (E) is a component that is used in order to endow the cured product obtained by curing the abovementioned composition with sufficient matte properties. Such unsaturated compounds are cured through the oxidation of the unsaturated bonds in the molecule by oxygen in the air, and are typically aliphatic compounds that have at least two unsaturated bonds per molecule. Examples of such unsaturated compounds include unsaturated higher fatty acids such as linolenic acid and linolic acid, etc.; fats and oils consisting of esters of unsaturated higher fatty acids and glycerol such as tung oil, linseed oil and soybean oil, etc.; esters of unsaturated higher fatty acids and alcohols such as methyl linolenate and methyl linolate, etc.; unsaturated hydrocarbon compounds such as butadiene, pentadiene and hexadiene, etc.; and polymers of such compounds. In particular, linolenic acid, alkyl linolenates, tung oil, linseed oil, 1,3-hexadiene and polybutadienes are especially desirable.

It is desirable that the content of component (E) be in the range of 0.01 to 50 parts by weight per 110 parts by weight of the silicone component in the abovementioned composition. A content in the range of 0.1 to 20 parts by weight is even more desirable, and a content in the range of 0.1 to 10 parts by weight is especially desirable. If the content of component (E) is less than the lower limit of the abovementioned range, it tends to become difficult to endow the resulting cured product with sufficient matte properties; on the other hand, if this content exceeds the upper limit of the abovementioned range, the mechanical characteristics of the resulting cured product tend to deteriorate.

The abovementioned composition is prepared by mixing components (A) through (E); however, the abovementioned composition may also contain alkoxysilanes expressed by the general formula

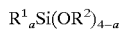

$R^1_a Si(OR^2)_{4-a}$ (in the above formula, $R^1$ indicates monovalent hydrocarbon groups, epoxy-functional monovalent organic groups or acrylic-functional monovalent organic groups which may be the same or different, $R^2$ indicates alkyl groups or alkoxyalkyl groups which may be the same or different, and a indicates 0, 1 or 2), or partially hydrolyzed condensation products of the same, as optional components for the purpose of improving the storage stability of the abovementioned composition, or for the purpose of improving the adhesive properties of the abovementioned composition. In the above formula, $R^1$ indicates monovalent hydrocarbon groups, epoxy-functional monovalent organic groups or acrylic-functional monovalent organic groups which may be the same or different. Examples of such monovalent hydrocarbon groups include alkyl groups such as methyl groups, ethyl groups, propyl groups, butyl groups, pentyl groups, hexyl groups, heptyl groups, octyl groups, nonyl groups, decyl groups and octadecyl groups, etc.; cycloalkyl groups such as cyclopentyl groups and cyclohexyl groups, etc.; aryl groups such as phenyl groups, tolyl groups, xylyl groups and naphthyl groups, etc.; aralkyl groups such as benzyl groups, phenethyl groups and phenylpropyl groups, etc.; and halogenated alkyl groups such as 3-chloropropyl groups and 3,3,3-trifluoropropyl groups, etc. Furthermore, examples of the abovementioned epoxy-functional monovalent organic groups include oxiranylalkyl groups such as 4-oxiranylbutyl groups and 8-oxiranyloctyl groups, etc.; glycidoxyalkyl groups such as 3-glycidoxypropyl groups and 4-glycidoxybutyl groups, etc.; and [other groups such as] 2-(3,4-epoxycyclohexyl)vinyl groups, etc. Furthermore, examples of the abovementioned acrylic-functional monovalent organic groups include 3-methacryloxypropyl groups and 4-methacryloxybutyl groups, etc. Furthermore, in the above formula, $R^2$ indicates alkyl groups or alkoxyalkyl groups; examples include alkyl groups such as methyl groups, ethyl groups, propyl groups, butyl groups, pentyl groups, hexyl groups, heptyl groups, octyl groups, nonyl groups, decyl groups and octadecyl groups, etc., and alkoxyalkyl groups such as methoxyethyl groups, ethoxyethyl groups, methoxypropyl groups and methoxybutyl groups, etc. In particular, methyl groups are especially desirable. Moreover, in the abovementioned formula, a is 0, 1 or 2, and is preferably 1.

Examples of the abovementioned alkoxysilanes and partially hydrolyzed condensation products of the same include alkoxysilanes such as tetramethoxysilane, tetraethoxysilane, methylcellosolve orthosilicate, methyltrimethoxysilane, methyltriethoxysilane, ethyltrimethoxysilane, vinyltrimethoxysilane, phenyltrimethoxysilane, methyltrimethoxyethoxysilane, dimethyldimethoxysilane and diphenyldimethoxysilane, etc.; epoxy-functional alkoxysilanes such as 4-oxiranylbutyltrimethoxysilane, 8-oxiranyloctyltrimethoxysilane, 3-glycidoxypropyltrimethoxysilane and 2-(3,4-epoxycyclohexyl)ethyltrimethoxysilane, etc.; acrylic-functional alkoxysilanes such as 3-methacryloxypropyltrimethoxysilane and 4-methacryloxybutyltrimethoxysilane, etc.; partially hydrolyzed condensation products of these alkoxysilanes; and mixtures of two or more of these alkoxysilanes or partially hydrolyzed condensation products of the same.

It is desirable that the content of such alkoxysilanes or partially hydrolyzed condensation products of the same be in the range of 0.01 to 20 parts by weight per 100 parts by weight of component (A) in the abovementioned composition, and a content in the range of 0.1 to 10 parts by weight is especially desirable. If the content of such alkoxysilanes or partially hydrolyzed condensation products of the same is less than the lower limit of the abovementioned range, the storage stability of the resulting composition tends to drop, and the adhesive properties tend to deteriorate; on the other hand, if this content exceeds the upper limit of the abovementioned range, the curing of the resulting composition tends to be conspicuously retarded.

Furthermore, optional components which may be added in order to improve the handling and working characteristics of abovementioned composition include acetylene type compounds such as 3-methyl-1-butyn-3-ol, 3,5-dimethyol-1-hexyn-3-ol and 3-phenyl-1-butyn-3-ol, etc., en-yne compounds such as 3-methyl-3-penten-1-yne and 3,5-dimethyl-3-hexen-1-yne, etc.; cylcoalkenylsiloxanes such as 1,3,5,7-tetramethyl-1,3,5,7-tetravinylcyclotetrasiloxane and 1,3,5,7-tetramethyl-1,3,5,7-tetrahexenylcyclotetrasiloxane, etc.; triazole compounds such as benzotriazole, etc.; and other hydrosilylation reaction inhibiting agents such as phosphine compounds, mercaptan compounds and hdyrazine compounds, etc. The content of such inhibiting agents varies according to the working and handling conditions and the curing conditions; generally, however, it is desirable that such inhibiting agents be used in amounts ranging from 10 to 1,000 ppm (in weight units) relative to the silicone component in the abovementioned composition.

Furthermore, the abovementioned composition may also contain as optional elements inorganic fillers such as fumed silica, finely powdered wet process silica, finely powdered quartz, finely powdered calcium carbonate, finely powdered magnesium carbonate, iron oxide, finely powdered titanium dioxide, finely powdered diatomaceous earth, finely powdered aluminum oxide, finely powdered aluminum hydroxide, finely powdered zinc oxide and finely powdered zinc carbonate, etc.; hydrophobic inorganic fillers obtained by surface-treating the abovementioned inorganic fillers with an organoalkoxysilane such as methyltrimethoxysilane, etc., an organohalosilane such as trimethylchlorosilane, etc., an organosilazane such as hexamethyldisilazane, etc., or a siloxane oligomer such as a dimethylsiloxane oligomer in which both ends of the molecular chains are closed by hydroxy groups, a methylphenylsiloxane oligomer in which both ends of the molecular chains are closed by hydroxy groups, or a methylvinylsiloxane oligomer in which both ends of the molecular chains are closed by hydroxy groups, etc.; organic solvents such as toluene, xylene, acetone, methyl ethyl ketone, methyl isobutyl ketone, hexane and heptane, etc.; non-cross-linkable organopolysiloxanes such as polydimethylsiloxanes in which both ends of the molecular chains are closed by trimethylsiloxy groups or polymethylphenylsiloxanes in which both ends of the molecular chains are closed by trimethylsiloxy groups; pigments such as carbon black or red oxide, etc.; and other additives such as flame-retarding agents, heat resistance improving agents, sensitizers, polymerization inhibitors, internal mold release agents, plasticizers, thixotropy-imparting agents, adhesion promoters and anti-mold agents, etc.

Methods which can be used to manufacture the abovementioned composition include methods in which components (A) through (E) and the abovementioned optional components are uniformly mixed using a universally known kneading apparatus such as a double roll, Banbury mixer, kneader mixer or planetary mixer, etc.

The curable silicone composition of the present invention can form a cured product with superior matte properties when cured by means of a hydrosilylation reaction and condensation reaction. Accordingly, this composition can be appropriately used as a filler or adhesive agent in display devices such as LED display devices, etc.

DESCRIPTION OF THE PREFERRED EMBODIMENTS

A particularly preferred embodiment of the present invention relates to a curable silicone composition which comprises:

(A) 100 parts by weight of an organopolysiloxane of the formula $$R^1{}_n SiO_{(4-n)/2}$$

wherein, $R^1$ is a substituted or unsubstituted monovalent hydrocarbon group which may be the same or different, and n is a positive number from 1.6 to 2.4;

(B) 0.01 to 50 parts by weight of an organic compound which has air-oxidation-curable unsaturated groups; and (C) a curing agent (used in an amount effective to cure the abovementioned component (A)).

Component (A) is an organopolysiloxane which can be expressed by the following formula:

$$R^1{}_n SiO_{(4-n)/2}$$

In the above formula, $R^1$ indicates substituted or unsubstituted monovalent hydrocarbon roups, which may be the same or different. Examples of such groups include alkyl groups such as methyl groups, ethyl groups, propyl groups and butyl groups, etc.; cycloalkyl groups such as cyclohexyl groups, etc.; alkenyl groups such as vinyl groups, allyl groups, butenyl groups and hexenyl groups, etc.; aryl groups such as phenyl groups and tolyl groups, etc.; and halogenated alkyl groups such as chloromethyl groups and 3,3,3-trifluoropropyl groups, etc. In cases where the present composition is a composition that is cured by organic peroxides, there are no restrictions on the groups bonded to the silicon atoms in component (A); however, in cases where the present composition is a composition that is cured by a hydrosilylation reaction, then it is necessary that at least two of the groups bonded to the silicon atoms in component (A) be the abovementioned alkenyl groups. Furthermore, n in the above formula is a positive number in the range of 1.6 to 2.4. This means that the molecular structure of the organopolysiloxane of the present component is substantially linear. However, a portion of the molecular structure may be branched or have a branch-form configuration; furthermore, an organopolysiloxane whose molecular structure is branched or has a branch-form configuration may be used in combination with the abovementioned organopolysiloxane.

The organic compound with air-oxidation-curable unsaturated groups comprising component (B) is used in order to endow the cured product of the present composition with sufficient matte properties. This component is cured by a reaction of the unsaturated groups in the molecule caused by oxygen contained in the air. Examples of such compounds include unsaturated higher fatty acids such as linolenic acid and linolic acid, etc.; oils or fats consisting of esters of unsaturated higher fatty acids and glycerol, such as tung oil, linseed oil and soybean oil, etc.; esters of unsaturated higher fatty acids and alcohols, such as methyl linolenate and methyl linolate, etc.; and unsaturated hydrocarbon compounds such as butadiene, pentadiene and hexadiene, etc., or polymers of the same. Especially desirable for use are linolenic acid, methyl linolenate, tung oil, 1,3-hexadiene and 1,4-polybutadiene.

The amount of component (B) that is added is an amount in the range of 0.01 to 50 parts by weight, preferably 0.1 to 20 parts by weight, and even more preferably 0.1 to 10 parts by weight, per 100 parts by weight of the abovementioned component (A). Note that if the amount of component (B) that is added is less than the lower limit of the abovementioned range, the cured product of the curable silicone composition obtained cannot be endowed with sufficient matte properties; on the other hand, if the amount that is added exceeds the upper limit of the abovementioned range, the mechanical characteristics of the cured product of the curable silicone composition obtained will show deterioration.

Component (C) of the present inention may be an organic peroxide or a combination of an organohydridopolysiloxane and a platinum type catalyst. In cases where an organic peroxide is selected as component (C), the curable silicone composition obtained becomes an organic-peroxide-curable composition; on the other hand, in cases where an organohydridopolysiloxane and a platinum type catalyst are selected, the curable silicone composition obtained becomes a hydrosilylation-reaction-curable composition.

Examples of such organic peroxides include benzoyl peroxide, p-methylbenzoyl peroxide, 2,4-dicumyl peroxide, 2,5-dimethyl-bis(2,5-t-butylperoxy)hexane, di-t-butyl peroxide and t-butyl perbenzoate, etc. It is desirable that the amount of organic peroxide added be in the range of 0.1 to 5 parts by weight per 100 parts by weight of the organopolysiloxane of component (A).

Note that organohydridopolysiloxanes are polysiloxanes that have at least two hydrogen atoms bonded to silicon atoms in each molecule. The molecular structure of the organohydridopolysiloxane used may be linear, branched or cyclic. Examples of such organohydridopolysiloxanes include dimethylpolysiloxanes in which both ends of the molecular chains are closed by dimethylhydridosiloxy groups, dimethylsiloxane-methylhydridosiloxane copolymers in which both ends of the molecular chains are closed by dimethylhydridosiloxy groups, methylhydridopolysiloxanes in which both ends of the olecular chains are closed by trimethylsiloxy groups, cyclic methylhydridosiloxanes, cyclic dimethylsiloxane-methylhydridosiloxane copolymers, and copolymers consisting of siloxane units expressed by the formula $(CH_3)_2HSiO_{1/2}$ and siloxane units expressed by the formula $SiO_{4/2}$.

It is desirable that the amount of such organohydridopolysiloxane added be an amount such that the concentration of hydrogen atoms bonded to silicon atoms in this component is 0.5 to 10 moles per mole of alkenyl groups in the abovementioned component (A).

Furthermore, examples of platinum catalysts which can be used include chloroplatinic acid, alcohol compounds of chloroplatinic acid, olefin complexes of platinum, alkenylsiloxane complexes of platinum and carbonyl complexes of platinum. It is desirable that the amount of platinum type catalyst added be an amount which is such that the amount of platinum metal in the present composition be in the range of 0.1 to 1,000 ppm (weight standard) relative to the organopolysiloxane of the abovementioned component (A). Furthermore, an amount in the range of 1 to 500 ppm is especially desirable.

As other optional components, the present composition may contain inorganic fillers such as fumed silica, precipitated silica, pulverized quartz, titanium oxide, iron oxide, calcium carbonate and magnesium carbonate, etc., pigments such as carbon black and iron oxide red, etc.; and other additives such as heat resistance improving agents, reaction controlling agents, mold release agents, plasticizers, sensitizers and polymerization inhibitors, etc.

There are no restrictions on the method used to manufacture the present composition; for example, a method in which component (A), component (B), component (C) and other optional components are uniformly mixed by means of a universally known kneading apparatus such as a double-roll apparatus, Banbury mixer, kneader mixer or planetary mixer, etc., may be used. Furthermore, there are no restrictions on the use of the present composition; since a delustered cured product can be formed, the present composition may be appropriately used for filling or adhesion in display devices such as LED's, etc.

EXAMPLES

The curable silicone composition of the present invention will be described in greater detail in terms of working examples. Furthermore, the viscosity values given in the working examples are values measured at 25° C. Moreover, the degree of matte finish of the cured product was evaluated by measuring the luster of the cured product (measurement angle 60°).

25 parts by weight of a dimethylpolysiloxane with a viscosity of 500 mPa·s in which both ends of the molecular chains were closed by trimethoxysiloxy groups, 75 parts by weight of a dimethylpolysiloxane with a viscosity of 2,000 mPa·s in which both ends of the molecular chains were closed by dimethylvinylsiloxy groups, and 5 parts by weight of carbon black, were uniformly mixed; afterward, 7 parts by weight of a dimethylpolysiloxane with a viscosity of 10 mPa·s in which both ends of the molecular chains were closed by dimethylhydridosiloxy groups (an amount which was such that the molar ratio of hydrogen atoms bonded to silicon atoms in this component to vinyl groups in the abovementioned dimethylpolysiloxane in which both ends of the molecular chains were closed by dimethylvinylsiloxane groups was 1.6), 1 part by weight of zirconium acetylacetonate, an isopropyl alcohol solution of chloroplatinic acid (used in an amount which was such that the platinum metal content (in weight units) was 100 ppm relative to the silicone component in the present composition), and 2 parts by weight of tung oil, were mixed, thus producing a curable silicone composition with a viscosity of 1,500 mPa·s. This curable silicone composition was cured by being heated for 2 hours at 80° C., thus producing a silicone rubber. When the luster of this silicone rubber was measured after the rubber was allowed to stand for one week at room temperature, the resulting uster value was 0.

(Working Example 1)

50 parts by weight of a dimethylpolysiloxane with a viscosity of 15,000 mPa·s in Which both ends of the molecular chains were closed by trimethoxysiloxy groups, 50 parts by weight of a dimethylpolysiloxane with a viscosity of 10,000 mPa·s in which both ends of the molecular chains were closed by dimethylvinylsiloxy groups, 10 parts by weight of fumed silica with a surface area of 200 m$^2$/g which had been subjected to a hydrophobic surface treatment by means of hexamethyldisilazane, and 0.5 parts by weight of benzophenone, were uniformly mixed; afterward, 0.5 parts by weight of a dimethylsiloxane-methylhydridosiloxane copolymer (molar ratio of dimethylsiloxane units to methylhydridosiloxane units: 3:5) with a viscosity of 5 mPa·s in which both ends of the molecular chains were closed by trimethylsiloxy groups (the amount of this component that was used was such that the molar ratio of hydrogen atoms bonded to silicon atoms in this component to vinyl groups in the abovementioned dimethylpolysiloxane in which both ends of the molecular chains were closed by dimethylvinylsiloxy groups was 0.5), 0.5 parts by weight of aluminum acetylacetonate, an isopropyl alcohol solution of chloroplatinic acid (used in an amount which was such that the platinum metal content (in weight units) was 100 ppm relative to the silicone component in the present composition), 1 part by weight of methyltrimethoxysilane and 3 parts by weight of linseed oil were mixed, thus producing a curable silicone composition. When the silicone rubber obtained by curing this curable silicone composition as in Working Example 1 was allowed to stand at room temperature in the same manner as in Working Example 1, and the luster was then measured, the luster value obtained was 36.

(Working Example 2)

50 parts by weight of a dimethylpolysiloxane with a viscosity of 15,000 mPa·s in which both ends of the molecular chains were closed by trimethoxysiloxy groups, 50 parts by weight of a mixture (viscosity=7,000 mPa·s) of an organosiloxane copolymer consisting of 57 mol % siloxane units expressed by the formula $SiO_{4/2}$, 40.5 mol % siloxane units expressed by the formula $(CH_3)_3SiO_{1/2}$ and 2.5 mol % siloxane units expressed by the formula $(CH_3)_2(CH_2=CH)SiO_{1/2}$ with a dimethylpolysiloxane having a viscosity of 2,000 mPa·s in which both ends of the molecular chains were closed by dimethylvinylsiloxy groups, and 5 parts by weight of carbon black, were uniformly mixed; afterward, 3 parts by weight of a dimethylsiloxane-methylhydridosiloxane copolymer (molar ratio of dimethylsiloxane units to methylhydridosiloxane units: 3:5) with a viscosity of 5 mPa·s in which both ends of the molecular chains were closed by trimethylsiloxy groups (the amount of this component that was used was such that the molar ratio of hydrogen atoms bonded to silicon atoms in this component to vinyl groups in the abovementioned mixture of the abovementioned organosiloxane copolymer and the abovementioned dimethylpolysiloxanes in which both ends of the molecular chains were closed by dimethylvinylsiloxy groups was 1.4), 0.1 parts by weight of diisopropoxybis(ethylacetoacetato)titanium, 2 parts by weight of methyltrimethoxysilane, an isopropyl alcohol solution of chloroplatinic acid (used in an amount which was such that the platinum metal content (in weight units) was 100 ppm relative to the silicone component in the present composition) and 0.5 parts by weight of tung oil were mixed, thus producing a curable silicone composition. When the silicone rubber obtained by curing this curable silicone composition as in Working Example 1 was allowed to stand at room temperature in the same manner as in Working Example 1, and the luster was then measured, the luster value obtained was 0.

(Working Example 3)

25 parts by weight of a dimethylpolysiloxane with a viscosity of 500 mPa·s in which both ends of the molecular chains were closed by trimethoxysiloxy groups, 75 parts by weight of a dimethylpolysiloxane with a viscosity of 2,000 mPa·s in which both ends of the molecular chains were closed by dimethylvinylsiloxy groups, and 5 parts by weight of carbon black, were uniformly mixed; afterward, 7 parts by weight of a dimethylpolysiloxane with a viscosity of 10 mPa·s in which both ends of the molecular chains were closed by dimethylhydridosiloxy groups (an amount which was such that the molar ratio of hydrogen atoms bonded to silicon atoms in this component to vinyl groups in the abovementioned dimethylpolysiloxane in which both ends of the molecular chains were closed by dimethylvinylsiloxane groups was 1.6), 1 part by weight of zirconium acetylacetonate, an isopropyl alcohol solution of chloroplatinic acid (used in an amount which was such that the platinum metal content (in weight units) was 100 ppm relative to the silicone component in the present composition) and 0.2 parts by weight of linolenic acid were mixed, thus producing a curable silicone composition. When the silicone rubber obtained by curing this curable silicone composition as in Working Example 1 was allowed to stand at room temperature in the same manner as in Working Example 1, and the luster was then measured, the luster value obtained was 0.

(Working Example 4)

25 parts by weight of a dimethylpolysiloxane with a viscosity of 500 mPa·s in which both ends of the molecular chains were closed by trimethoxysiloxy groups, 75 parts by weight of a dimethylpolysiloxane with a viscosity of 2,000 mPa·s in which both ends of the molecular chains were closed by dimethylvinylsiloxy groups, and 5 parts by weight of carbon black, were uniformly mixed; afterward, 7 parts by weight of a dimethylpolysiloxane with a viscosity of 10 mPa·s in which both ends of the molecular chains were closed by dimethylhydridosiloxy groups (an amount which was such that the molar ratio of hydrogen atoms bonded to silicon atoms in this component to vinyl groups in the abovementioned dimethylpolysiloxane in which both ends of the molecular chains were closed by dimethylvinylsiloxane groups was 1.6), 1 part by weight of zirconium acetylacetonate, an isopropyl alcohol solution of chloroplatinic acid (used in an amount which was such that the platinum metal content (in weight units) was 100 ppm relative to the silicone component in the present composition) and 0.5 parts by weight of methyl linolenate were mixed, thus producing a curable silicone composition. When the silicone rubber obtained by curing this curable silicone composition as in Working Example 1 was allowed to stand at room temperature in the same manner as in Working Example 1, and the luster was then measured, the luster value obtained was 0.

(Working Example 5)

25 parts by weight of a dimethylpolysiloxane with a viscosity of 500 mPa·s in which both ends of the molecular chains were closed by trimethoxysiloxy groups, 75 parts by weight of a dimethylpolysiloxane with a viscosity of 2,000 mPa·s in which both ends of the molecular chains were closed by dimethylvinylsiloxy groups, and 5 parts by weight of carbon black, were uniformly mixed; afterward, 7 parts by weight of a dimethylpolysiloxane with a viscosity of 10 mPa·s in which both ends of the molecular chains were closed by dimethylhydridosiloxy groups (an amount which was such that the molar ratio of hydrogen atoms bonded to silicon atoms in this component to vinyl groups in the abovementioned dimethylpolysiloxane in which both ends of the molecular chains were closed by dimethylvinylsiloxane groups was 1.6), 1 part by weight of zirconium acetylacetonate, an isopropyl alcohol solution of chloroplatinic acid (used in an amount which was such that the platinum metal content (in weight units) was 100 ppm relative to the silicone component in the present composition) and 0.5 parts by weight of 1,3-hexadiene were mixed, thus producing a curable silicone composition. When the silicone rubber obtained by curing this curable silicone composition as in Working Example 1 was allowed to stand at room temperature in the same manner as in Working Example 1, and the luster was then measured, the luster value obtained was 0.

(Working Example 6)

25 parts by weight of a dimethylpolysiloxane with a viscosity of 500 mPa·s in which both ends of the molecular chains were closed by trimethoxysiloxy groups, 75 parts by weight of a dimethylpolysiloxane with a viscosity of 2,000 mPa·s in which both ends of the molecular chains were closed by dimethylvinylsiloxy groups, and 5 parts by weight of carbon black, were uniformly mixed; afterward, 7 parts by weight of a dimethylpolysiloxane with a viscosity of 10 mPa·s in which both ends of the molecular chains were closed by dimethylhydridosiloxy groups (an amount which was such that the molar ratio of hydrogen atoms bonded to silicon atoms in this component to vinyl groups in the abovementioned dimethylpolysiloxane in which both ends of the molecular chains were closed by dimethylvinylsiloxane groups was 1.6), 1 part by weight of zirconium acetylacetonate, an isopropyl alcohol solution of chloroplatinic acid (used in an amount which was such that the platinum metal content (in weight units) was 100 ppm relative to the silicone component in the present composition) and 1 part by weight of a liquid-form polybutadiene were mixed, thus producing a curable silicone composition. When the silicone rubber obtained by curing this curable silicone composition as in Working Example 1 was allowed to stand at room temperature in the same manner as in Working Example 1, and the luster was then measured, the luster value obtained was 0.

(Working Example 7)

In contrast, a curable silicone composition was prepared in the same manner as in Working Example 1, except that no tung oil was added. When the silicone rubber obtained by curing this curable silicone composition as in Working Example 1 was allowed to stand at room temperature in the same manner as in Working Example 1, and the luster was then measured, the luster value obtained was 90.

A curable silicone composition was prepared in the same manner as in Working Example 1, except that olive oil was added (in the same amount) instead of tung oil. When the silicone rubber obtained by curing this curable silicone composition as in Working Example 1 was allowed to stand at room temperature in the same manner as in Working Example 1, and the luster was then measured, the luster value obtained was 77.

A curable silicone composition was prepared in the same manner as in Working Example 2, except that no benzophenone or linseed oil was added. When the silicone rubber obtained by curing this curable silicone composition as in Working Example 2 was allowed to stand at room temperature in the same manner as in Working Example 2, and the luster was then measured, the luster value obtained was 82.

A curable silicone composition was prepared in the same manner as in Working Example 3, except that no tung oil was added. When the silicone rubber obtained by curing this curable silicone composition as in Working Example 3 was allowed to stand at room temperature in the same manner as in Working Example 3, and the luster was then measured, the luster value obtained was 89.

A curable silicone composition was prepared in the same manner as in Working Example 6, except that n-hexane was added (in the same amount) instead of 1,3-hexadiene. When the silicone rubber obtained by curing this curable silicone composition as in Working Example 6 was allowed to stand at room temperature in the same manner as in Working Example 1, and the luster was then measured, the luster value obtained was 90.

25 parts by weight of a dimethylpolysiloxane with a viscosity of 500 mPa·s in which both ends of the molecular chains were closed by trimethoxysiloxy groups, 75 parts by weight of a dimethylpolysiloxane with a viscosity of 2,000 mPa·s in which both ends of the molecular chains were closed by dimethylvinylsiloxy groups, 5 parts by weight of carbon black and 30 parts by weight of powdered mica with a mean particle size of 5 μm were uniformly mixed; afterward, 7 parts by weight of a dimethylpolysiloxane with a viscosity of 10 mPa·s in which both ends of the molecular chains were closed by dimethylhydridosiloxy groups (an amount which was such that the molar ratio of hydrogen atoms bonded to silicon atoms in this component to vinyl groups in the abovementioned dimethylpolysiloxane in which both ends of the molecular chains were closed by dimethylvinylsiloxane groups was 1.6), 1 part by weight of zirconium acetylacetonate and an isopropyl alcohol solution of chloroplatinic acid (used in an amount which was such that the platinum metal content (in weight units) was 100 ppm relative to the silicone component in the present composition) were mixed, thus producing a curable silicone composition with a viscosity of 3,500 mPa·s. When the silicone rubber obtained by curing this curable silicone composition as in Working Example 1 was allowed to stand at room temperature in the same manner as in Working Example 1, and the luster was then measured, the luster value obtained was 57.

The curable silicone composition a particularly preferred embodiment of the present invention will be described in detail by means of a working example. Furthermore, the viscosity values given in this working example are values at 25° C. The degree of delustering of the cured product was evaluated by measuring the luster of the cured product (measurement angle: 60°).

100 parts by weight of an organopolysiloxane with a viscosity of 400 mPa·s consisting of 99 mol % dimethyl siloxane units and 1 mol % dimethylvinylsiloxane units, and 100 parts by weight of pulverized silica with a mean particle size of 5 μm, were uniformly mixed. Afterward, an isopropyl alcohol solution of chloroplatinic acid (the amount of chloroplatinic acid added was an amount which was such that the concentration of platinum metal was 0.001 wt % relative to the abovementioned dimethylpolysiloxane), 12 parts by weight of a dimethylpolysiloxane with a viscosity of 10 mPa·s in which both ends of the molecular chains were closed by dimethylhydridosiloxy groups, 1 part by weight of a dimethylsiloxane methylhydridosiloxane copolymer (molar ratio of dimethylsiloxane units to methylhydridosiloxane units=3:5) with a viscosity of 5 mPa·s in which both ends of the molecular chains were closed by trimethylsiloxy groups, and 1.5 parts by weight of tung oil, were mixed, thus producing a curable silicone composition.

Next, this curable silicone composition was cured by being heated for 2 hours at 80° C., thus producing a rubber-form cured product. When the degree of luster of this cured product was measured after the cured product was allowed to stand for one week at room temperature, the luster value obtained was zero.

In contrast, a curable silicone composition was manufactured in the same manner as in the example above, except that no tung oil was added. When this composition was cured in the same manner as in the Working Example, and the degree of luster of the cured product was measured, the luster value obtained was 60.

The curable silicone composition of the present invention is characterized by the fact that this composition is capable of forming a cured product with superior matte properties when cured.

That which is claimed is:

1. A curable silicone composition which comprises (A) a mixture of (a) an organopolysiloxane which contains at least two alkoxy groups bonded to silicon atoms in each molecule, and which does not contain any alkenyl groups bonded to silicon atoms, and an organopolysiloxane which contains at least two alkenyl groups bonded to silicon atoms in each molecule, and which does not contain any alkoxy groups bonded to silicon atoms, or (b) an organopolysiloxane which respectively contains at least two alkoxy groups bonded to silicon atoms and two alkenyl groups bonded to silicon atoms in each molecule,
   (B) an organopolysiloxane which contains at least two hydrogen atoms bonded to silicon atoms in each molecule,
   (C) a condensation reaction catalyst,
   (D) a platinum type catalyst, and
   (E) an air-oxidation-curable unsaturated compound.

2. The curable silicone composition as recited in claim 1, wherein the air-oxidation-curable unsaturated compound is an aliphatic compound which has at least two unsaturated bonds per molecule.

3. The curable silicone composition as recited in claim 1, wherein the air-oxidation-curable unsaturated compound is linolenic acid, an alkyl linolenate, tung oil, linseed oil, 1,3-hexadiene or a polybutadiene.

4. The curable silicone composition as recited in claim 1, wherein the air-oxidation-curable unsaturated compound is from 0.01 to 50 parts by weight per 100 parts by weight of the silicone component.

5. The curable silicone composition as recited in claim 1, wherein component (E) is an aliphatic compound which has at least two unsaturated bonds per molecule.

6. The curable silicone composition as recited in claim 1, wherein component (E) is linolenic acid, an alkyl linolenate, tung oil, linseed oil, 1,3-hexadiene or a polybutadiene.

7. The curable silicone composition as recited in claim 1, wherein said composition is a filler or adhesive agent used in a display device.

8. A curable silicone composition which comprises:
   (A) 100 parts by weight of an organopolysiloxane of the formula $$R^1{}_n SiO_{(4-n)/2}$$

wherein $R^1$ is a substituted or unsubstituted monovalent hydrocarbon group which may be the same or different, and n is a positive number from 1.6 to 2.4;

(B) 0.01 to 50 parts by weight of an organic compound which has air-oxidation-curable unsaturated groups; and (C) a curing agent selected from an organic peroxide, and a combination of an organohydridopolysiloxane and a platinum catalyst.

9. The curable silicone composition as recited in claim 8, wherein the organopolysiloxane of (A) has at least two aliphatic unsaturated groups per molecule, and the curing agent of (C) includes an organohydrido-polysiloxane and a platinum type catalyst.

10. The curable silicone composition as recited in claim 8, wherein said composition is used as a display device filler or adhesive.

* * * * *